(12) United States Patent
Hanson

(10) Patent No.: US 6,766,001 B1
(45) Date of Patent: Jul. 20, 2004

(54) PROCESS AND APPARATUS FOR MESSAGING UPON INCOMPLETE CALL

(75) Inventor: Joel Hanson, Anamosa, IA (US)

(73) Assignee: World Com, Inc., Ashburn, VA (US)

( * ) Notice: Subject to any disclaimer, the term of this patent is extended or adjusted under 35 U.S.C. 154(b) by 0 days.

(21) Appl. No.: 09/539,337

(22) Filed: Mar. 30, 2000

(51) Int. Cl.[7] .............................................. H04M 1/64
(52) U.S. Cl. ................................ 379/88.26; 455/412.1; 455/413
(58) Field of Search .................... 379/67.1, 88.2, 379/79, 88.23, 88.22, 70, 71, 72, 73, 74, 75, 76, 77, 78, 80, 81, 82, 83, 84, 88.24, 88.25, 88.26; 455/412.1, 412.2, 413

(56) References Cited

U.S. PATENT DOCUMENTS

| | | | |
|---|---|---|---|
| 4,680,786 A | 7/1987 | Baker et al. ................... 379/60 |
| 4,809,321 A | 2/1989 | Morganstein et al. ........ 379/211 |
| 4,908,850 A | 3/1990 | Masson et al. ................ 379/88 |
| 4,932,042 A | 6/1990 | Baral et al. .................... 379/67 |
| 4,941,167 A | 7/1990 | Cannalte et al. .............. 379/67 |
| 4,959,855 A | * 9/1990 | Daudelin ................ 379/213.01 |
| 5,014,296 A | * 5/1991 | Saigano ...................... 379/67.1 |
| 5,036,533 A | 7/1991 | Carter et al. ................... 379/59 |
| 5,105,458 A | * 4/1992 | Takenaka .................... 379/67.1 |
| 5,163,087 A | 11/1992 | Kaplan ......................... 379/94 |
| 5,333,180 A | * 7/1994 | Brown et al. .................. 379/79 |
| 6,058,180 A | * 5/2000 | Young ......................... 379/234 |
| 6,195,418 B1 | * 2/2001 | Ridgley ................... 379/88.23 |
| 6,389,276 B1 | * 5/2002 | Brilla et al. ................. 455/413 |
| 2002/0172333 A1 | * 11/2002 | Gross et al. ............. 379/88.22 |

* cited by examiner

Primary Examiner—Fan Tsang
Assistant Examiner—Gerald Gauthier

(57) ABSTRACT

Processes and apparatus for collection and delivery of voice messages. The process includes identifying information indicative of a calling party attempting to complete a call to a another party and then identifying that a condition other than ring no answer or normal busy exists preventing the calling party from completing a call to the another party. In response to identifying that a condition exists that prevents call completion, the process includes storing a message from the calling party to the another party in a memory, storing the information indicative of the calling party in the memory and attempting to deliver the stored message to the another party at a later time.

32 Claims, 4 Drawing Sheets

PROCESS AND APPARATUS FOR MESSAGING UPON INCOMPLETE CALL

TECHNICAL FIELD

The invention relates to computerized telecommunications. More particularly, the invention relates to processes and apparatus for message storage and retrieval in such systems.

BACKGROUND OF THE INVENTION

Telephone messaging machines, systems and methods are known in the art. For example, a telephone messaging system is described in U.S. Pat. No. 5,036,533, entitled "System For Providing Automatic Voice Messaging In A Digital Network Environment" and issued to Carter et al., hereby incorporated herein by reference. This system is intended for use with digital telephone systems and provides a voice messaging capability when the calling party is unable to reach another party because the another party is using their telephone, providing the calling party with a normal busy signal, or does not answer their telephone, providing the calling party with a "ring no answer" situation.

However, many other kinds of situations may result in an incomplete call. The system described in the above-referenced patent does not provide a capability for storing a message when, for example, a modem or a facsimile machine answers the calling party.

Other situations in which the calling party may be frustrated in efforts to reach another party may stem from a variety of different causes. These may include busy or inoperative trunk lines, a busy exchange that cannot accommodate additional calls at that time (both of which later may result in a "fast busy" signal) or the another party's phone line or lines being busy (i.e., "normal busy" or engaged. Further causes may include a "ring no answer" condition that may be due to equipment malfunction, power failure or other causes not necessarily attributable to the another party and other conditions that give rise to a failure to complete an attempted calling transaction.

When these conditions prevent call completion within the confines of a single telephone network, automatic messaging capabilities within that network may permit the calling party to record a message that the another party may later retrieve. However, in situations where larger numbers of networks and switches are involved, it may not be obvious which of the networks or switches need to execute the message storing function, how to bill the calling party for the messaging service or how to effectively handle a presently existing volume of calling parties desiring to avail themselves of message-storing and delivery services.

Accordingly, it is desirable to provide a system and process for telephone messaging that allows a message to be exchanged under a broader range of circumstances than is possible in the prior art.

SUMMARY OF THE INVENTION

In one aspect, the present invention provides a process for collection and delivery of voice messages. The process includes identifying information indicative of a calling party attempting to complete a call to another party and then identifying that a condition other than ring no answer or normal busy exists preventing the calling party from completing a call to the another party. In response to identifying that a condition exists that prevents call completion, the process includes storing a message from the calling party to the another party in a memory, storing the information indicative of the calling party in the memory and attempting to deliver the stored message to the another party at a later time.

In another aspect, the present invention includes an article., of manufacture comprising a computer usable medium having computer readable code embodied therein. The computer readable code is configured to cause a messaging system to store and later attempt to deliver at least one message to be delivered. The computer readable program code in the article of manufacture is also configured to identify information indicative of a calling party attempting to complete a call to another party and to identify that a condition exists preventing the calling party from completing a call to the another party. In response to identifying that a condition other than ring no answer or normal busy exists preventing call completion, the computer readable program code in the article of manufacture is further configured to store a message from the calling party to the another party in a memory, to store the information indicative of the calling party in the memory and to attempt to deliver the stored message to the another party at a later time.

In yet another aspect, the present invention provides a computer-implemented messaging system. The messaging system includes memory configured to provide an operating system and operative to store files representing at least one message to be delivered and identification information indicative of a party leaving the at least one message and processing circuitry. The processing circuitry is configured to identify information indicative of a calling party attempting to complete a call to another party and to identify that a condition other than ring no answer or normal busy exists preventing the calling party from completing a call to the another party. In response to identification that a condition exists preventing call completion, the processing circuitry is further configured to store a message from the calling party to the another party in a memory, to store the information indicative of the calling party in the memory and to attempt to deliver the stored message to the another party at a later time.

In a still further aspect, the present invention includes a computer data signal embodied in a transmission medium. The computer data signal includes a call monitoring program configured to identify information indicative of a calling party attempting to complete a call to another party and to identify that a condition other than ring no answer or normal busy exists preventing the calling party from completing a call to the another party. The computer data signal also includes a data storage program configured to store a message from the calling party to the another party in a memory and to store the information indicative of the calling party in the memory and a message delivery program configured to attempt to deliver the stored message to the another party at a later time.

DETAILED DESCRIPTION OF THE PREFERRED EMBODIMENTS

Figure 1:
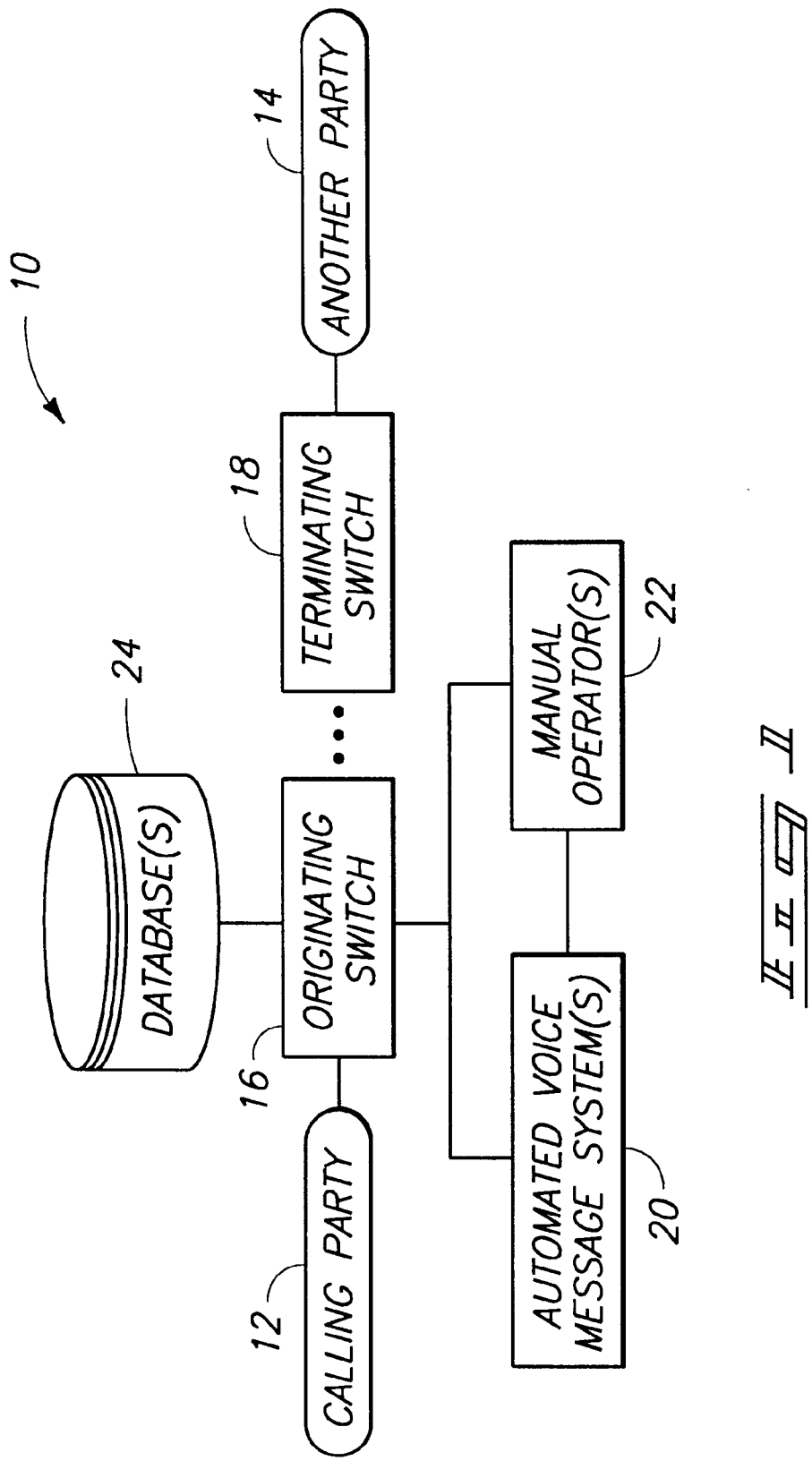
FIG. 1 is a simplified block diagram of a telephone network, in accordance with an embodiment of the present invention.

FIG. 1 is a simplified block diagram of a telephone network 10, in accordance with an embodiment of the present invention. The telephone network 10 includes multiple telephones or other message exchange devices, configured to process audio and/or digital signals, some of which are represented in FIG. 1 as a calling party 12 and another party 14.

In making a call from the calling party 12 to another party 14, the calling party 12 enters data causing an originating switch 16 to select a terminating switch 18 that is coupled to the another party 14. Interconnection of the originating switch with the terminating switch 18 may be through a number of intermediate call-routing and distribution elements, represented by ellipsis in FIG. 1. In many cases, the calling party 12 will be connected with the another party 14 and they will be able to exchange information as desired. However, in situations where the calling party 12 is unable to reach the another party 14, it is desirable to be able to provide a messaging capability allowing the calling party 12 to store a message for the another party 14 using either an automated voice message system 20 or via an operator-assisted messaging system 22. An operator-assisted messaging system 22 may be needed in some situations. These may include situations where the calling party 12 has a telephone that is defective in some manner, where noise on the telephone line inhibits effective DTMF keying of commands using the telephone keypad or where a severe language barrier or temporary medical condition (e.g., a visit to the dentist) causes the calling party 12 to be unable to successfully interact with voice recognition software.

In either case, an entity operating the overall network 10 will desire information allowing billing to take place for the services provided. In one embodiment, the calling party 12 is identified using a database 24 of previously-stored information identifying the calling party 12 and an account that is associated with the calling party 12.

It will be appreciated that while only one database 24, automated voice messaging system 20 and manual operator messaging system 22 are shown in conjunction with the exemplary originating switch 16 in FIG. 1 for simplicity of illustration and ease of understanding, there may be many such systems associated with many switches 16, 18 located throughout the system. It will be further appreciated that many switches function as both originating and terminating switches in normal operation of the network 10.

Automatic call distribution systems sometimes rely on technology to automatically identify the telephone number of the calling party 12. See, for example, U.S. Pat. No. 5,163,087 to Kaplan (incorporated herein by reference) which discloses a system that translates an Automatic Number Identification (ANI) of the calling party 12 into a customer database such as the database 24 or that translate the ANI into a previously-defined customer account number. In one embodiment, the network 10 identifies the calling party 12 using ANI. In one embodiment, the network 10 accepts billing information, such as a credit card number, that is entered by the calling party 12 using a touch-tone pad or voice recognition software, and that then may be stored, e.g., in the database 24.

Figure 2:
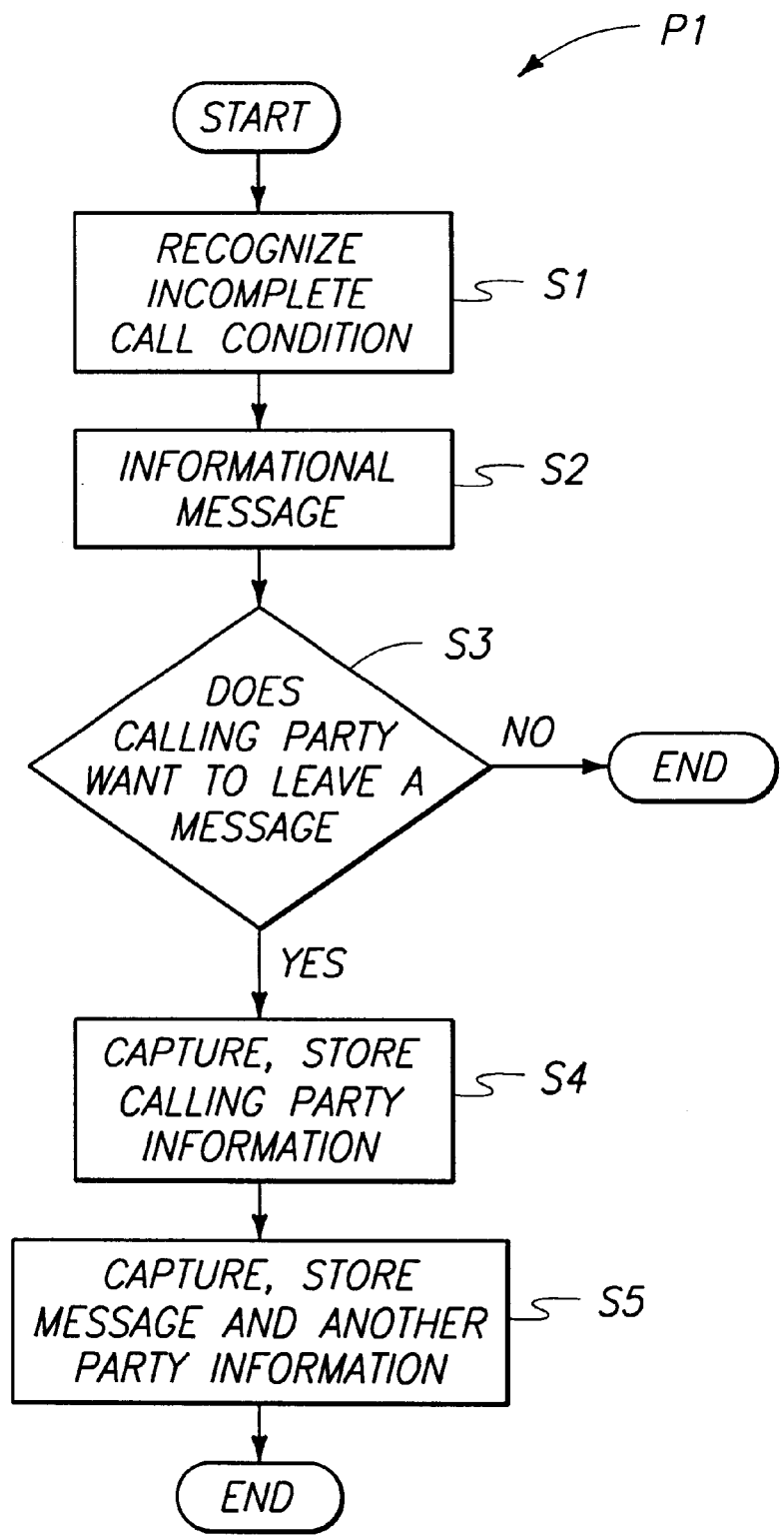
FIG. 2 is a simplified flow chart of a process for leaving a message for later delivery, in accordance with an embodiment of the present invention.

FIG. 2 is a simplified flow chart of a process P1 for leaving a message for later delivery, in accordance with an embodiment of the present invention. The process P1 begins with a step S1 identifying that a call from the calling party 12 will not be completed. The step S1 may be triggered by a predetermined number of rings, recognition of a fax or modem response from the another party 14, recognition of a busy signal or a fast busy signal, recognition of special information tones (SIT) ("do-dah-dee"), timeout, ringback stopped, answering machine or other call incomplete situation. In one embodiment, the step S1 is carried out by the terminating switch 18. In one embodiment, the step S1 is carried out by the originating switch 16 or at another point in the network 10. In order to take messages from the calling party 12 when the reason for non-completion of the call is that there are no trunk lines available to couple the originating switch 16 to the terminating switch 18, it is necessary that the steps in the process P1 be carried out by portions of the network 10 that are located between the trunk lines and the calling party 12, e.g., by the originating switch 16.

The process P1 then generates a message to the calling party 12 in a step S2. In one embodiment, the message includes information regarding options that the calling party 12 has for leaving messages. In one embodiment, the message advises the calling party 12 that they will be billed in the event that the message is delivered. In one embodiment, the calling party 12 is given an option to obviate the informational message of the step S2, e.g., by pushing a predetermined key on a telephone keypad.

The process P1 then determines if the calling party 12 wishes to leave a message in a query task S3. When the calling party 12 does not wish to leave a message, the process P1 terminates. When the calling party 12 does wish to leave a message, the process P1 continues.

The process P1 then captures and stores information indicative of the calling party 12 in a step S4. In one embodiment, ANI is used to identify the calling party 12 and to look up billing information relating to the calling party 12 that was previously stored in the database 24. In one embodiment, the calling party 12 is given an option to provide credit or debit data relative to an account. In one embodiment, the calling party 12 is given an option to cause the system 10 to use data relating to the another party 14 for billing purposes.

The process P1 then captures and stores a message from the calling party 12 together with information indicative of the calling party 12 and information indicative of the another party 14 in a step S5. In one embodiment, the message, the information indicative of the calling party 12 and the information indicative of the another party 14 are stored in association with the originating switch 16, which may obviate use of long distance lines for message capture and storage. In one embodiment, the message, the information indicative of the calling party 12 and the information indicative of the another party 14 are stored in association with the terminating switch 18, which may obviate repeated use of long distance lines for later message polling/delivery efforts. The process P1 then ends.

Figure 3:
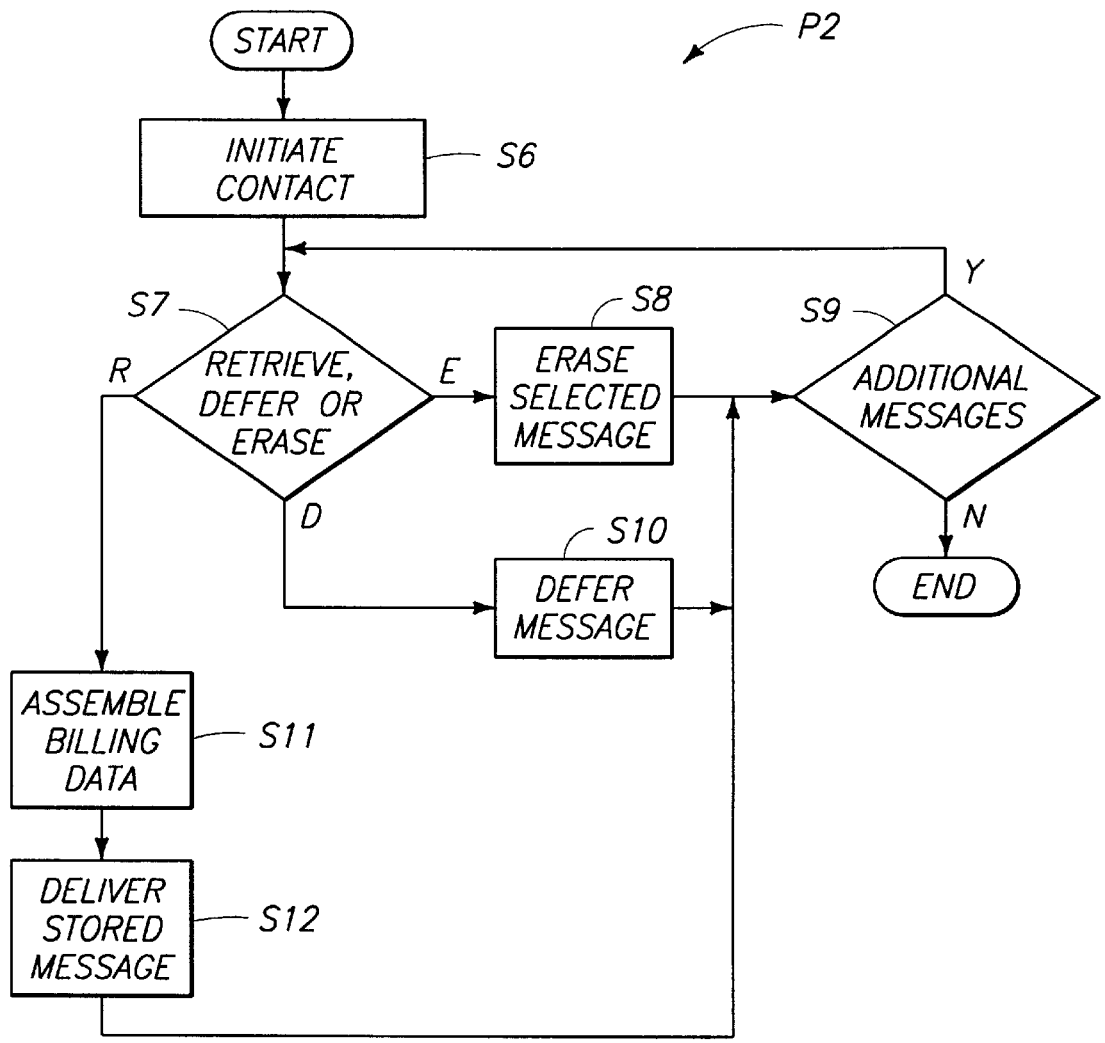
FIG. 3 is a simplified flow chart of a process for automatically retrieving, deferring or erasing a stored message from the calling party, in accordance with an embodiment of the present invention.

FIG. 3 a simplified flow chart of a process P2 for retrieving, deferring or erasing a stored message from the calling party 12 in response to selections made by the another party 14, in accordance with an embodiment of the present invention. The process P2 begins, in a step S6, by initiating contact between the another party 14 and the network 10. In one embodiment, the step S6 is carried out by automatically placing a call to the another party 14 to advise the another party 14 of the fact that one or more messages to the another party 14 have been stored.

In one embodiment, the another party 14 has previously selected or presently selects notification options such as another telephone number, email, a pager, facsimile or other notification of stored messages. In one embodiment, the initiating contact step S6 includes providing the another party 14 with information identifying or indicative of the calling party 12. In one embodiment, the initiating contact step S6 includes the another party 14 supplying a PIN or other coded identification that is verified by the network 10 prior to continuing the process P2.

In a query task S7, the process P2 determines if the another party 14 wants to retrieve, defer or erase one or more of the stored messages.

When the query task S7 determines, in response to signals from the another party 14, or from user options preset by the another party 14, that the another party 14 wants to erase a stored message, the process P2 erases one or more stored messages in a step S8.

A query task S9 then determines if there are any additional stored messages for the another party 14. When the query task S9 determines that there are additional stored messages for the another party 14, control passes back to the query task S7.

When the query task S7 determines that the another party 14 wants to defer one or more stored messages, the process P2 defers these messages in a step S10. Control then passes to the query task S9 to determine if there are any additional stored messages for the another party 14.

When the query task S9 determines that there are no additional stored messages for the another party 14, the process P2 ends.

When the query task S7 determines that the another party 14 wants to retrieve one or more stored messages, the process P2 proceeds to a step S11. The query task S7 may include providing the another party 14 with information, such as a name or telephone number, corresponding to the calling party 12.

In the step S11, billing data are assembled and a bill is prepared to reflect delivery of the stored message. In one embodiment, the calling party 12 is billed in the step S11 using the information indicative of the calling party that was collected in the step S4.

In a step S12, one or more stored messages are delivered to the another party 14. Control then passes to the step S9 to determine if there are additional stored messages and proceeds as discussed above until there are no additional stored messages or until the stored messages have all been erased, deferred or retrieved.

Figure 4:
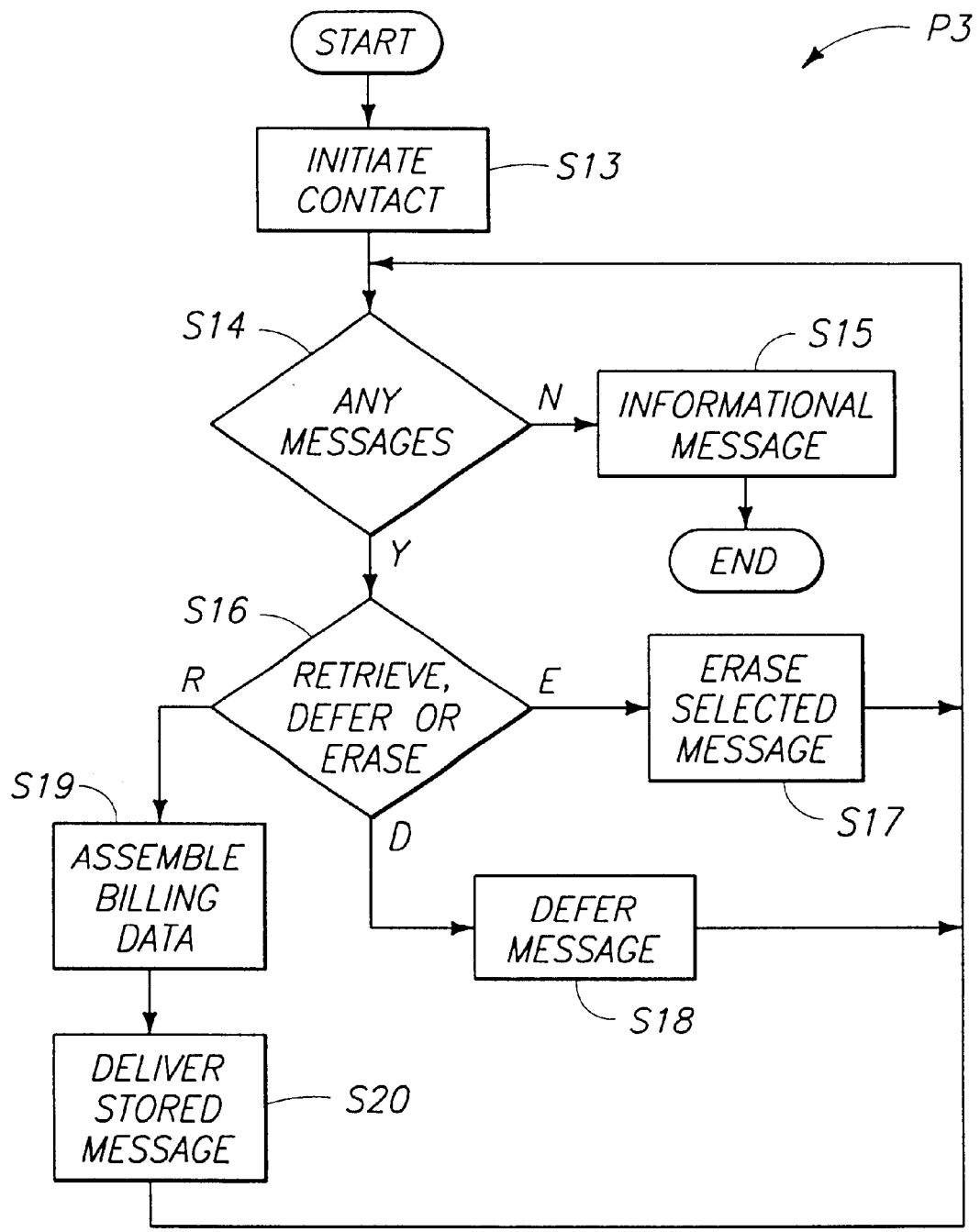
FIG. 4 is a simplified flow chart of a process for retrieving, deferring or erasing a stored message from the calling party, in accordance with an embodiment of the present invention.

FIG. 4 a simplified flow chart of a process P3 for retrieving, deferring or erasing a stored message from the calling party 12, in accordance with an embodiment of the present invention. The process P3 begins with a step S13 by initiating contact between the another party 14 and the network 10. In one embodiment, the step S13 is carried out by the another party 14 placing a call to retrieve messages stored in the network 10. In one embodiment, the initiating contact step S13 includes the another party 14 supplying a PIN or other coded identification that is verified by the network 10 prior to continuing the process P3.

In a query task S14, the process P3 determines if there are any stored messages for the another party 14.

When the query task S14 determines that there are no stored messages for the another party 14, the process P3 advises the another party 14 of this in a step S15. The process P3 then ends or provides the another party 14 with other options, such as an opportunity to update notification options. When the query task S14 determines that there are stored messages for the another party 14, control passes to a query task S16.

In the query task S16, the process P3 determines if the another party 14 wants to retrieve, defer or erase one or more stored messages.

When the query task S16 determines that the another party 14 wants to erase a stored message, the process P3 erases one or more stored messages in a step S17. The process P3 then proceeds to the query task S14 to determine if there are any additional stored messages for the another party. When the query task S16 determines that the another party 14 wants to defer one or more stored messages, the process P3 defers these messages in a step S18 and then proceeds to the query task S14 to determine if there are any additional stored messages for the another party 14.

When the query task S14 determines that there are no additional stored messages for the another party 14, the step S15 provides an informational message to the another party 14 and the process P3 ends.

When the query task S16 determines that the another party 14 wants to retrieve one or more stored messages, the process P3 proceeds to a step S19. The query task S16 may include providing the another party 14 with information, such as a name or telephone number, corresponding to the calling party 12 who left the stored message.

In the step S19, billing data are assembled and a bill is prepared to reflect delivery of the stored message. In one embodiment, the calling party 12 is billed in the step S19 using the information indicative of the calling party that was collected in the step S4 (FIG. 2).

In a step S20, one or more stored messages are retrieved by the another party 14. Control then passes to the step S14 to determine if there are additional stored messages, as described above.

In one embodiment, the processes P1, P2 and P3 of FIGS. 2, 3 and 4 are carried out automatically by computer equipment in the network 10. In one embodiment, portions of the processes P1, P2 and P3 are carried out with assistance from operators, for example, when a severe language barrier, static or equipment malfunction inhibit the automated voice messaging system 20 of FIG. 1. In one embodiment, where the processes P1, P2 and P3 are carried out automatically, languages are chosen for the informational messages automatically, based upon comparison of, e.g., the another party's telephone number or the ANI data to previously-stored data related to the another party 14 and/or the calling party 12, or similar comparisons using data relevant to the another party 14.

The above-described method is defined by discrete digital circuitry or software or firmware installed in general-purpose computing machinery in order to cause that machinery to be able to provide these features. In one embodiment, this may be effectuated by transmitting the software over telephone lines. In one embodiment, this may be effectuated by downloading software from another computing machine using a broad coverage network such as the Internet. In either case, a carrier wave modulated with data representing suitable computer programming is transmitted from a data source to a data sink and then ultimately is installed onto the computing machinery that is to implement functionality associated with the software.

The protection sought is not to be limited to the disclosed embodiments, which are given by way of example only, but instead is to be limited only by the scope of the appended claims as properly interpreted in accordance with the doctrine of equivalents.

What is claimed is:

1. A process for collection and delivery of audio signals, the process comprising:
   identifying information indicative of a calling party attempting to complete a call to another party;
   identifying that a condition exists preventing the calling party from completing a call to the another party, the condition being chosen from a group comprising: a response to the call by a fax machine, a response to the call by a modem, a fast busy, a trunk line busy, special information tones and ringback stopped;
   storing a message from the calling party to the another party in a memory;
   storing the information indicative of the calling party in the memory; and
   attempting to deliver the stored message to the another party at a later time.

2. A process as claimed in claim 1, further comprising:
   determining when the stored message has been delivered to the another party; and
   preparing billing data from the stored message and the information indicative of the calling party, the billing data indicating that the calling party is to be billed for delivery of the stored message.

3. A process as claimed in claim 1, further comprising:
   determining when the stored message has been delivered to the another party;
   preparing billing data from the stored message, the another party and the information indicative of the calling party; and
   billing the calling party for storage and delivery of the stored message.

4. A process as claimed in claim 1, wherein identifying information indicative of the calling party comprises employing automatic number identification of the calling party in response to identifying that the condition exists preventing the calling party from completing a call.

5. A process as claimed in claim 1, wherein storing a message from the calling party to the another party further comprises:
   providing information to the calling party describing a message storage capability;
   accepting a message from the calling party to the another party; and
   storing the message in the memory.

6. A process as claimed in claim 1, wherein attempting to deliver the stored message to the another party at a later time further comprises executing an activity chosen from a group comprising one or more attempts to: deliver a voicemail message by attempting to place one or more telephone calls to the another party, deliver a voicemail message by attempting to place one or more telephone calls to another telephone number known to be associated with the another party, deliver a voicemail message by recognizing an identification code provided by the another party in a call from the another party to a system embodying the computer readable code and the memory, deliver a page to the another party indicative of an identity of the calling party and delivering an email to the another party indicative of an identity of the calling party.

7. A process as claimed in claim 1, wherein attempting to deliver the stored message to the another party at a later time further comprises:
   providing information to the another party indicative of an identity of the calling party;
   accepting an instruction from the another party regarding disposition of the stored message in response to the another party providing suitable identification indicia;
   erasing the stored message when the instruction includes a command to erase the stored message; and
   delivering the stored message to the another party when the instruction includes a command to deliver the stored message.

8. An article of manufacture comprising a computer usable medium having computer readable code embodied therein to cause a messaging system to store and later attempt to deliver at least one message to be delivered, the computer readable program code in the article of manufacture being configured to:
   identify information indicative of a calling party attempting to complete a call to another party;
   identify that a condition exists preventing the calling party from completing a call to the another party, the condition being chosen from a group comprising: a response to the call by a fax machine, a response to the call by a modem, a fast busy, a trunk line busy, special information tones and ringback stopped;
   store a message from the calling party to the another party in a memory;
   store the information indicative of the calling party in the memory; and
   attempt to deliver the stored message to the another party at a later time.

9. An article of manufacture as claimed in claim 8, wherein the computer readable code in the article of manufacture is further configured to:
   determine when the stored message has been delivered to the another party;
   prepare billing data from the stored message, the another party and the information indicative of the calling party.

10. An article of manufacture as claimed in claim 8, wherein the computer readable code in the article of manufacture is further configured to:
    determine when the stored message has been delivered to the another party;
    prepare billing data from the stored message, the another party and the information indicative of the calling party; and
    bill the calling party for storage and delivery of the stored message.

11. An article of manufacture as claimed in claim 8, wherein the computer readable code in the article of manufacture configured to identify information indicative of the calling party comprises computer readable code in the article of manufacture configured to employ automatic number identification of the calling party in response to identifying that the condition exists preventing the calling party from completing a call.

12. An article of manufacture as claimed in claim 8, wherein the computer readable code in the article of manufacture configured to store a message from the calling party to the another party is further configured to:
    provide information to the calling party describing a message storage capability;
    accept a message from the calling party to the another party; and
    store the message in the memory.

13. An article of manufacture as claimed in claim 8, wherein the computer readable code in the article of manufacture configured to attempt to deliver the stored message to the another party at a later time is further configured to execute an activity chosen from a group comprising one or more attempts to: deliver a voicemail message by attempting to place one or more telephone calls to the another party, deliver a voicemail message by attempting to place one or more telephone calls to another telephone number known to be associated with the another party, deliver a voicemail message by recognizing an identification code provided by the another party in a call from the another party to a system embodying the computer readable code and the memory, deliver a page to the another party indicative of an identity of the calling party and deliver an email to the another party indicative of an identity of the calling party.

14. An article of manufacture as claimed in claim 8, wherein the computer readable code in the article of manufacture is further configured to:
provide information to the another party indicative of an identity of the calling party;
accept an instruction from the another party regarding disposition of the stored message in response to the another party providing suitable identification indicia;
erase the stored message when the instruction includes a command to erase the stored message; and
deliver the stored message to the another party when the instruction includes a command to deliver the stored message.

15. A computer implemented messaging system comprising:
memory configured to provide an operating system and operative to store files representing at least one message to be delivered and identification information indicative of a party leaving the at least one message; and
processing circuitry configured to:
identify information indicative of a calling party attempting to complete a call to another party;
identify that a condition exists preventing the calling party from completing a call to the another party, the condition being chosen from a group comprising: a response to the call by a fax machine, a response to the call by a modem, a fast busy, a trunk line busy, special information tones and ringback stopped;
store a message from the calling party to the another party in a memory;
store the information indicative of the calling party in the memory; and
attempt to deliver the stored message to the another party at a later time.

16. A computer implemented messaging system as claimed in claim 15, wherein the processing circuitry is further configured to:
determine when the stored message has been delivered to the another party; and
prepare billing data from the stored message and the information indicative of the calling party.

17. A computer implemented messaging system as claimed in claim 15, wherein the processing circuitry is further configured to:
determine when the stored message has been delivered to the another party; and
prepare billing data from the stored message and the information indicative of the calling party, the billing data indicating that the calling party is to be billed for delivery of the stored message.

18. A computer implemented messaging system as claimed in claim 15, wherein the processing circuitry is further configured to employ automatic number identification of the calling party in response to identifying that the condition exists preventing the calling party from completing a call.

19. A computer implemented messaging system as claimed in claim 15, wherein the processing circuitry is configured to store a message from the calling party to the another party is further configured to:
provide information to the calling party describing a message storage capability;
accept a message from the calling party to the another party; and
store the message in the memory.

20. A computer implemented messaging system as claimed in claim 15, wherein the processing circuitry is configured to attempt to deliver the stored message to the another party at a later time is further configured to execute an activity chosen from a group comprising one or more attempts to: deliver a voicemail message by attempting to place one or more telephone calls to the another party, deliver a voicemail message by attempting to place one or more telephone calls to another telephone number known to be associated with the another party, deliver a voicemail message by recognizing an identification code provided by the another party in a call from the another party to a system embodying the computer readable code and the memory, deliver a page to the another party indicative of an identity of the calling party and deliver an email to the another party indicative of an identity of the calling party.

21. A computer data signal embodied in a transmission medium comprising:
a call monitoring program configured to identify information indicative of a calling party attempting to complete a call to another party and to identify that a condition exists preventing the calling party from completing a call to the another party, the condition being chosen from a group comprising: a response to the call by a fax machine, a response to the call by a modem, a fast busy, a trunk line busy, special information tones and ringback stopped;
a data storage program configured to store a message from the calling party to the another party in a memory and to store the information indicative of the calling party in the memory; and
a message delivery program configured to attempt to deliver the stored message to the another party at a later time.

22. A computer data signal embodied in a transmission medium as claimed in claim 21, wherein the message delivery program is further configured to:
determine when the stored message has been delivered to the another party; and
prepare billing data from the stored message and the information indicative of the calling party.

23. A computer data signal embodied in a transmission medium as claimed in claim 21, wherein the message delivery program is further configured to:
determine when the stored message has been delivered to the another party;
prepare billing data from the stored message, the another party and the information indicative of the calling party; and bill the calling party for storage and delivery of the stored message.

24. A computer data signal embodied in a transmission medium as claimed in claim 21, wherein the data storage program is further configured to employ automatic number identification of the calling party in response to the call monitoring program identifying that the condition exists preventing the calling party from completing a call.

25. A computer data signal embodied in a transmission medium as claimed in claim 21, wherein the message delivery program is further configured to execute an activity chosen from a group comprising one or more attempts to: deliver a voicemail message by attempting to place one or more telephone calls to the another party, deliver a voicemail message by attempting to place one or more telephone calls to another telephone number known to be associated with the another party, deliver a voicemail message by recognizing an identification code provided by the another party in a call from the another party to a system embodying the computer readable-code and the memory, deliver a page to the another party indicative of an identity of the calling party and deliver an email to the another party indicative of an identity of the calling party.

26. A computer data signal embodied in a transmission medium as claimed in claim 21, wherein the message delivery program is further configured to:
provide information to the another party indicative of an identity of the calling party;
accept an instruction from the another party regarding disposition of the stored message in response to the another party providing suitable identification indicia;
erase the stored message when the instruction includes a command to erase the stored message; and
deliver the stored message to the another party when the instruction includes a command to deliver the stored message.

27. A process for collection and delivery of audio signals, the process comprising:
identifying information indicative of a calling party, the calling party attempting to complete a call to another party;
identifying that a condition other than ring no answer or normal busy exists preventing the calling party from completing the call to the another party;
storing a message from the calling party to the another party in a memory;
storing the information indicative of the calling party in the memory; and
attempting to deliver the stored message to the another party at a later time, wherein
attempting to deliver the stored message to the another party at a later time further comprises executing one or more attempts to deliver an email to the another party indicative of an identity of the calling party.

28. The process of claim 27, wherein the attempting to deliver the stored message to the another party at a later time further comprises executing one or more attempts to deliver a page to the another party indicative of an identity of the calling party.

29. An article of manufacture comprising a computer usable medium having computer readable code embodied therein to cause a messaging system to store and later attempt to deliver at least one message to be delivered, the computer readable program code in the article of manufacture being configured to:
identify information indicative of a calling party, the calling party attempting to complete a call to another party;
identify that a condition other than ring no answer or normal busy exists preventing the calling party from completing the call to the another party;
store a message from the calling party to the another party in a memory;
store the information indicative of the calling party in the memory; and
attempt to deliver the stored message to the another party at a later time, wherein
the computer readable code in article of manufacture configured to attempt to deliver the stored message to the another party at a later time is further configured to execute one or more attempts to deliver an email to the another party indicative of an identity of the calling party.

30. The article of manufacture of claim 29, wherein the computer readable code in the article of manufacture configured to attempt to deliver the stored message to the another party at a later time is further configured to execute one or more attempts to deliver a page to the another party indicative of an identity of the calling party.

31. A computer data signal embodied in a transmission medium comprising:
a call monitoring program configured to identify information indicative of a calling party, the calling party attempting to complete a call to another party, and the call monitoring program further configured to identify that a condition other than ring no answer or normal busy exists preventing the calling party from completing a call to the another party;
a data storage program configured to store a message from the calling party to the another party in a memory and to store the information indicative of the calling party in the memory; and
a message delivery program configured to attempt to deliver the stored message to the another party at a later time, wherein
the message delivery program is further configured to attempt to deliver an email to the another party indicative of an identity of the calling party.

32. The computer data signal embodied in a transmission medium as claimed in claim 31, wherein the message delivery program is further configured to attempt to deliver a page to the another party indicative of an identity of the calling party.

* * * * *